(12) United States Patent
LeVey et al.

(10) Patent No.: US 6,899,500 B2
(45) Date of Patent: May 31, 2005

(54) FASTNER HAVING MULTIPLE-BOSSED LEAD

(75) Inventors: Kenneth LeVey, West Chicago, IL (US); Stephen Dohm, Geneva, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/885,796

(22) Filed: Jun. 19, 2001

(65) Prior Publication Data

US 2002/0192050 A1 Dec. 19, 2002

(51) Int. Cl.⁷ .............................................. F16B 35/04
(52) U.S. Cl. ..................... 411/411; 411/416; 411/412; 411/308
(58) Field of Search ............................... 411/411, 412, 411/416, 417, 308–311, 386, 387.4

(56) References Cited

U.S. PATENT DOCUMENTS

| | | | |
|---|---|---|---|
| 23,409 A | * | 3/1859 | Thom ........................... 411/411 |
| 3,258,797 A | | 7/1966 | Budd |
| 3,455,198 A | | 7/1969 | Barrett |
| 3,661,194 A | | 5/1972 | Macfarlane et al. |
| 4,069,730 A | * | 1/1978 | Gutshall ........................ 411/386 |
| 4,430,036 A | | 2/1984 | Chapman |
| 4,486,135 A | | 12/1984 | Kazino |
| 4,637,767 A | | 1/1987 | Yaotani et al. |
| 4,652,194 A | | 3/1987 | Tajima et al. |
| 4,718,802 A | | 1/1988 | Rockenfeller et al. |
| 4,793,219 A | | 12/1988 | Wozniak |
| 4,793,220 A | | 12/1988 | Yamamoto et al. |
| 4,818,165 A | * | 4/1989 | Shirai ........................... 411/178 |
| 4,820,098 A | | 4/1989 | Taubert et al. |
| 4,842,467 A | | 6/1989 | Armstrong |
| 5,044,853 A | | 9/1991 | Dicke |
| 5,061,136 A | | 10/1991 | Dixon et al. |
| 5,088,869 A | | 2/1992 | Greenslade |
| 5,110,245 A | | 5/1992 | Hiroyuki |
| 5,188,496 A | | 2/1993 | Giannuzzi |
| 5,385,439 A | | 1/1995 | Hurdle |
| RE34,969 E | | 6/1995 | Dixon et al. |
| 5,674,035 A | | 10/1997 | Hettich et al. |
| 5,779,417 A | | 7/1998 | Barth et al. |
| 5,827,030 A | | 10/1998 | Dicke |
| 5,885,041 A | | 3/1999 | Giannuzzi et al. |
| 5,897,280 A | | 4/1999 | Dicke |
| 5,921,735 A | | 7/1999 | Hughes |
| 5,957,646 A | | 9/1999 | Giannuzzi et al. |
| 5,961,267 A | | 10/1999 | Goss et al. |
| 6,045,312 A | | 4/2000 | Hsing |
| 6,056,491 A | | 5/2000 | Hsu |
| 6,086,302 A | | 7/2000 | Gerhard |
| 6,254,327 B1 | | 7/2001 | Chen |
| 6,340,277 B1 | | 1/2002 | Koenig et al. |

FOREIGN PATENT DOCUMENTS

| | | | | |
|---|---|---|---|---|
| DE | 197 35 280 A 1 | | 8/1997 | |
| FR | 1.292.780 | | 6/1961 | |
| GB | 1120991 | * | 7/1968 | ................. 411/417 |
| GB | 1 482 624 | | 8/1977 | |

* cited by examiner

Primary Examiner—William L. Miller
(74) Attorney, Agent, or Firm—Fletcher Yoder

(57) ABSTRACT

A threaded fastener includes a lead having bosses separated from one another by bases along the thread crest. Two such leads may be formed such that lead-in profiles for of one lead are disposed at locations corresponding to locations of lead-out profiles for the other lead. The lead-in and lead-out profiles of the bossed, and other features of the bosses and bases may differ from one another along the fastener shank. The boss profiles may be selected to reduce insertion torque and to provide excellent resistance to pullout. The fastener may be formed by roll threading via a tool made by a plunge EDM process.

44 Claims, 4 Drawing Sheets

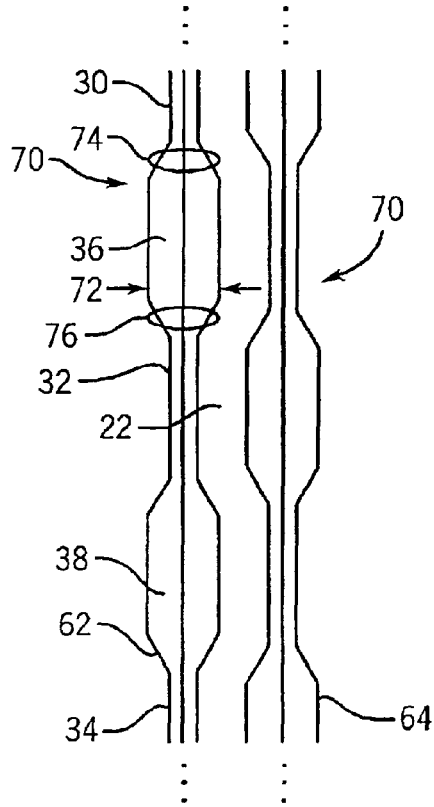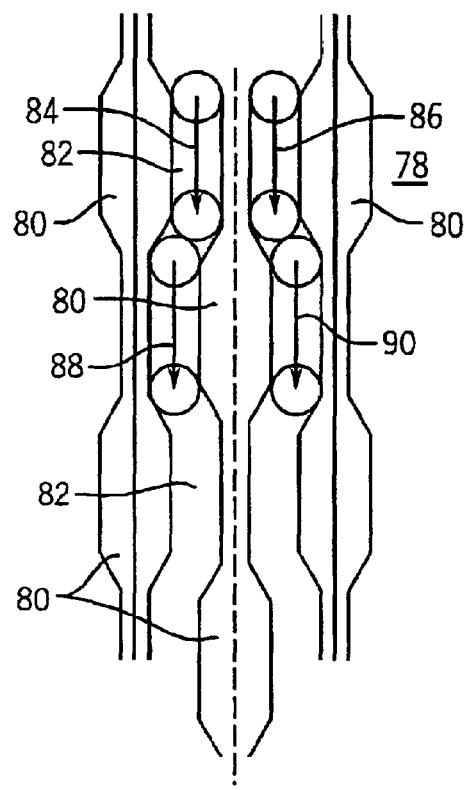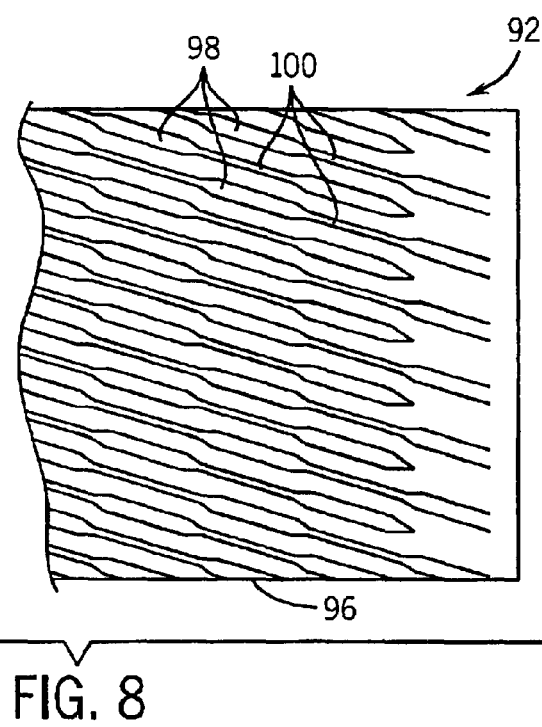

FASTNER HAVING MULTIPLE-BOSSED LEAD

BACKGROUND OF THE INVENTION

The present invention relates generally to the field of fasteners, and more particularly to a fastener having at least one lead form with multiple bosses to provide improved insertion and pullout properties.

In the field of fasteners, particularly threaded fasteners, a wide range of configurations are known and currently available. In general, threaded fasteners present a threaded shank on which one or more leads are formed. The leads create a helical inclined plane which contacts mating surfaces of one or more mechanical components as the fastener is rotated for insertion or removal. Various threaded fastener designs have been specifically adapted for use with various materials, such as wood, metals, composite materials, concrete, and so forth.

In most conventional threaded fasteners, a head is formed at the end of the threaded shank to facilitate rotation of the fastener into and out of an application. The shank itself presents a lower tip opposite the head, with the lead of the thread being formed around the shank. The characteristics of the lead determine both the torque required to insert the fastener into the application, the torque required to remove the fastener, and the force which resists pullout of the fastener once in place. In most conventional applications, the thread is uniform in shape over the entire shank, with a reduction in height being provided in certain applications, such as for wood or metal screws.

Specialty fasteners have been developed that present a variety of features along the lead. For example, screws having ridges or depressions along the lead have been developed, such as for penetrating into certain materials during insertion. In general, however, these designs have presented less flexibility and less than optimal performance in use. There is still a need, therefore, for improved fasteners which can be adapted for particular purposes and materials, through creative lead design. There is a particular need for fasteners which present relatively uniform or constant insertion torque characteristics, with excellent pullout resistance, and which can be manufactured in straightforward and inexpensive ways.

SUMMARY OF THE INVENTION

The present technique provides an improved fastener design which responds to such needs. The fastener presents a lead which includes multiple bosses separated by recesses. In a particularly favored embodiment, two leads of similar geometry are provided. The bosses may be identical to one another along the entire length of the lead, or may be varied to provide the desired characteristics. For example, the lead-in of the bosses need not be identical to the lead-out, and the lead-in and lead-out of bosses along the length of the leads may vary. Similarly, the length, height and form of the bosses may vary along the length of the leads. Where more than one lead is provided, overlap between the bosses formed on the lead may be provided so as to maintain generally uniform torque during insertion of the fastener in an application. The recesses between the bosses also offers locations in which certain materials may be allowed to collect, such as cold-flow plastics, plaster or concrete, or so forth. The lead-out of the bosses may be formed so as to provide enhanced pullout resistance.

The fasteners designed in accordance with the present techniques may be used in a wide variety of applications. They are particularly well suited, however, to applications in which the fastener interfaces directly with one or more materials to be secured, such as metals, plastics, wood, concrete, and other composite materials. The overall configuration of the leads and bosses can be adapted specifically to such materials, and to the desired level of insertion torque pullout resistance, and so forth. The fasteners are particularly adapted, moreover, for mass production, such as through roll thread forming operations.

BRIEF DESCRIPTION OF THE DRAWINGS

The foregoing and other advantages of the invention will become apparent upon reading the following detailed description and upon reference to the drawings in which:

FIG. 6 is a plan view of two leads, shown extended vertically, illustrating overlap between portions of the leads;

FIG. 7 is a plan view of a portion of a tool used in forming a die for machining the fasteners, such type illustrated in FIG. 6, in a roll threading operation;

FIG. 8 is an elevational view of a face of an exemplary die formed through the use of a tool such as that illustrated in FIG. 7;

DETAILED DESCRIPTION OF SPECIFIC EMBODIMENTS

Figure 1:
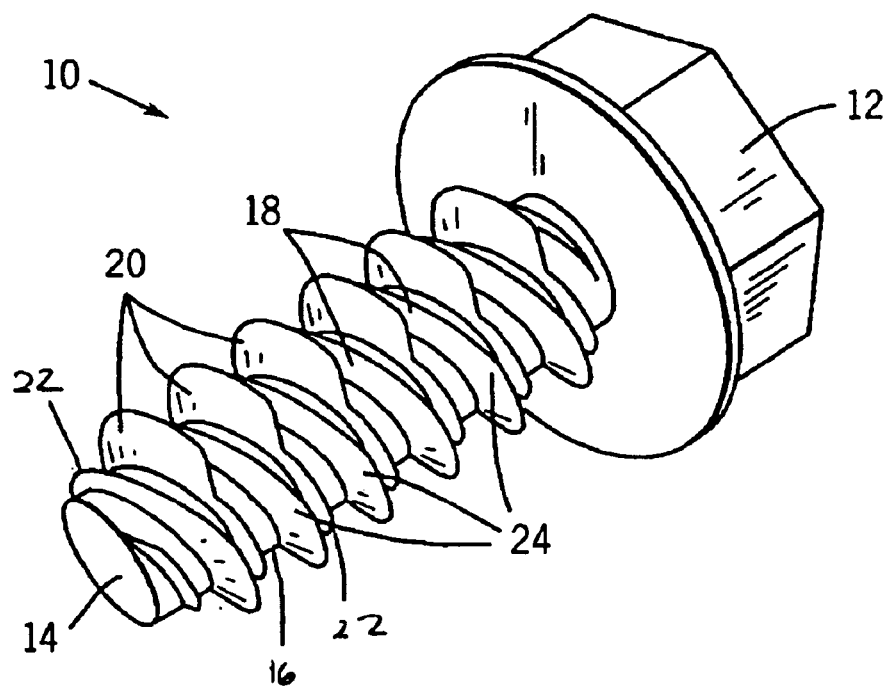
FIG. 1 is a prospective view of a threaded fastener in accordance with aspects of the present technique.

Turning now to the figures, and referring first to FIG. 1, an exemplary fastener formed in accordance with aspects of the present technique is illustrated and designated generally by the reference numeral 10. Fastener 10 includes a head 12 a tip 14, and a threaded shank section 16. Any suitable head and tip portion may be employed in the fastener, such as the hex head illustrated in FIG. 1. The tip portion may be similar in diameter to the threaded shank portion, or may be profiled, such as to facilitate insertion into certain materials.

In the illustrated embodiment, fastener 10 has one or more leads which are configured in accordance with aspects of the present technique. In the embodiment illustrated in FIG. 1, two such leads 18 and 20 are provided and have similar or identical configurations, displaced 180 degrees at corresponding locations along shank 16. As described below, the configurations may also be different between the multiple leads, where such multiple leads are provided, and the configurations may evolve along the length of each lead. Even where a single lead is provided, as discussed below, features formed along the single lead may evolve between tip 14 and head 12. In general, each lead presents a base 22, and a series of bosses 24 rising from the base. The particular forms of the bases and bosses provided on the leads, and presently favored methods for forming these features are described in greater detail below.

Figure 1A:
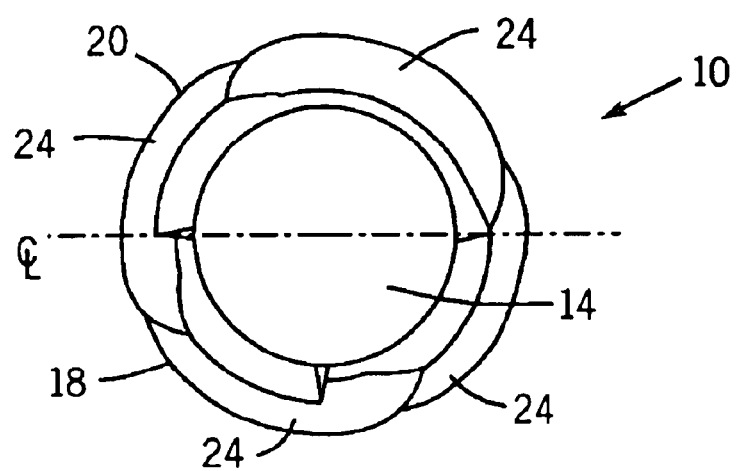
FIG. 1A is a sectional view through the fastener illustrated in FIG. 1 showing the configuration of bosses formed in the two leads of the embodiment of FIG. 1.
Figure 2:
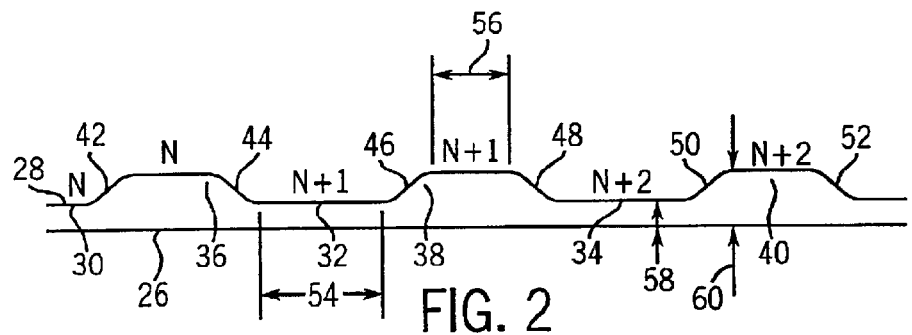
FIG. 2 is a diagram illustrating an exemplary lead of a fastener such as that illustrated in FIG. 1.

FIG. 1A illustrates a sectional view through the fastener of FIG. 1. As shown in FIG. 2, the bosses 24 formed along the shank of the fastener are positioned with respect to one another to provide a desired pattern for entry and exit of the bosses into a material being fastened. In particular, the bosses 24 formed on lead 18 are positioned so as to correspond to recesses formed between bosses on lead 20. As described more filly below, it has been found the illustrated configuration of corresponding locations for recesses and bosses on the double-lead fastener facilitates insertion, enhances resistance to pullout, and provides locations in which materials may settle or flow. It may also be noted from the illustration of FIG. 1A that in the presently preferred configuration, two bosses 24 are located for each revolution of leads 18 and 20, with the bosses being offset from one another by 180 degrees.

FIG. 2 illustrates an exemplary thread profile for one of the leads in a fastener of the type illustrated in FIG. 1. In the diagram of FIG. 2, reference numeral 26 refers to the root of the thread, while reference numeral 28 refers to the thread crest profile itself. For the sake of illustration, multiple base profiles are illustrated, including a first base 30, a second base 32 and a third base 34. Along the length of the thread profile 28, these bases may be referred to as successive features N+1, and N+2. Similarly, a series of bosses are formed between the bases, including a first boss 36 adjacent to base 30, a second boss 38 adjacent to base 32, and a third boss 40 adjacent to base 34. These bosses, too, may be referred to as successive features in, N+1 and N+2. In the embodiment illustrated in FIG. 2, each of the bases 30, 32 and 34 are generally identical to one another, while each of the bosses 36, 38 and 40 are similarly identical to one another. That is, the length, height, form, and adjacent features of each of these bases and bosses are similar between the successive N, N+1 and N+2 levels.

While the identical features along the length of the thread profile may be highly desirable in certain applications, the present technique also permits features to be varied along the length of the lead. In the embodiment illustrated in FIG. 2, for example, each boss presents a lead-in profile and a lead-out profile which can be tailored to specific applications, such as to provide a desired insertion torque and pullout resistance. In the embodiment illustrated in FIG. 2, for example, the boss 36 at the N level has a lead-in 42 and a lead-out 44, while bosses 38 and 40 at the N+1 and N+2 levels lead-ins 46 and 50 respectively, and lead-outs 48 and 52 respectively. As described in greater detail below, these features can be altered along the length of the fastener to provide differing characteristics, such as for low insertion torque near the tip of the fastener with greater insertion torque as the fastener is progressively inserted, or vise versa. Similarly, pullout resistance can be varied by altering the same lead-in and lead-out profiles. As will be appreciated by those skilled in the art, in general, the lead-in profile will have a greater effect on the insertion torque, while the lead-out profile will have a greater effect upon the pullout resistance.

Figure 3:
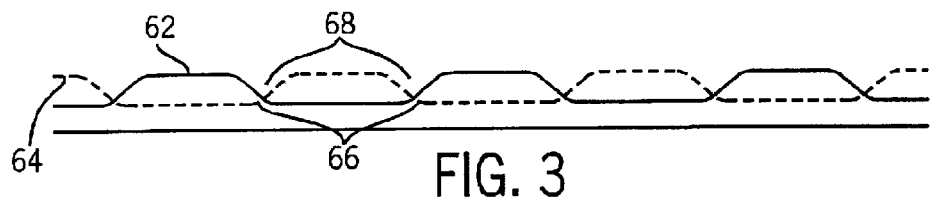
FIG. 3 is a diagram illustrating an exemplary configuration of two leads for a fastener such as that illustrated in FIG. 1 in accordance with particular aspects of the present technique.

Other features of the thread profile 28 illustrated in FIG. 2 may also be adapted for specific applications. By way of example, each base 30, 32 and 34 has a length, such as length 54 illustrated for base 32, which may be altered along the length of the fastener. That is, bases in levels in N+1 and N+2 may differ from one another, where desired. Similarly, each boss 36, 38 and 40 has a predetermined length, represented by reference numeral 56 for boss 38, which may be adapted and varied along the length of the fastener between the respective lead-in and lead-out profiles. Moreover, the height of the bases, as indicated at reference numeral 58, may be altered, as may the height 60 of the bosses. Other features, such as the configuration and shape of the bosses and bases may also be changed or evolve along the length of the fastener as described in greater detail below.

Where more than one lead is provided on the fastener, the features along each lead may simply repeat, or may evolve separately along their lengths, and the features may generally be positioned to correspond to one another in predetermined manners along the length of the shank. FIG. 3 illustrates, for example, profiles of a pair of leads 62 and 64, each presenting bases and bosses a described above with reference to FIG. 2. In addition to allowing for adaptation or tailoring of the bosses and bases along the length of each lead, the positions of these features may be provided in corresponding manners, such as to provide overlap 66 between lead-in and lead-out regions, or other regions of the leads, and separations 68 between such features. For example, where two leads are provided, lead-out portions of bosses from one lead may be positioned to correspond to lead-in portions of bosses from the second lead. Thus, relatively uniform insertion torque may be attained by alternating the boss being driven into the material to be fastened between the two leads. At the same time, the multiple lead-outs of the bosses from each lead aide, together, in resisting pullout.

Figure 4:
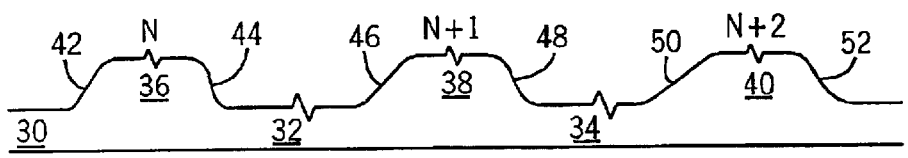
FIG. 4 is a diagram illustrating evolution of characteristics of a lead for a fastener of the type illustrated in FIG. 1 in accordance with aspects of the present technique.

FIG. 4 illustrates an exemplary embodiment of a lead profile wherein features including bases and bosses evolve along the length of the lead. As shown in FIG. 4, a first base 30 at a level N along the lead joins a first boss 36 at the N level by a lead-in 42. The boss 36 then joins a second base 32 at a level N+1 by a lead-out 44. As the lead continues, then, bosses 38 and 40 join bases 32 and 34 by lead-ins 46 and 50 respectively, with bosses 38 and 40 terminating lead-outs 48 and 52 respectively. At each level N, N+1 and N+2, then, differing angles and forms may be provided for the lead-ins and lead-outs to provide the desired insertion and pullout resistance characteristics described above.

Figure 5:
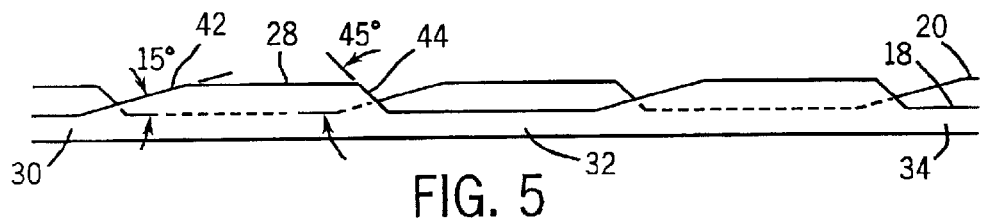
FIG. 5, is diagram similar to that of FIGS. 2, 3 and 4, illustrating a particularly preferred configuration of a double-lead fastener in accordance with aspects of the present technique.

As illustrated in FIG. 5, in a particularly preferred present configuration, the lead-in profiles of a double-lead fastener correspond in location about the shank to locations of the lead-out profiles of the second lead. Moreover, as shown in FIG. 5, it has been found that a relatively shallow lead-in angle, such as 15 degrees, facilitates insertion of the fastener in applications. Excellent pull-out resistance has been found with lead-out angles which are relatively steep, on the order of 45 degrees in the embodiment illustrated in FIG. 5. Thus, as noted above, the lead-in and lead-out profiles need not be identical to one another, and optimized profiles, such as a 15 degree/45 degree configuration of FIG. 5, may be found to be optimal for certain applications.

FIG. 6 illustrates a pair of leads for a fastener of the type shown in FIG. 1, provided with bases and bosses which correspond to one another in location and overlap as illustrated generally in FIG. 3. Reference numerals on the first lead 62 are labeled to correspond to those features illustrated in FIG. 2, including bases 30, 32 and 34, and bosses 36 and 38. Similar or identical bases and bosses are provided along the second lead 64. In the plan view of FIG. 6, however, it can be seen that the form, referred to generally by reference numeral 70 of each lead can evolve along the length of the lead between the fastener tip and head. By way of example, the width 72 of each boss can be identical along the length of the lead, or may be varied. Similarly, the lead-in form 74 may be modified to provide the desired performance characteristics, particularly the insertion torque. The lead-out form 76 may be tailored in a similar manner. In general, these features may be contoured, angled, or otherwise adapted, and, as mentioned above, need not be identical along the length of the leads.

Various techniques may be employed for manufacturing fasteners in accordance with the features described above. In a presently preferred method, electric-discharge machining (EDM) is employed to create dies which are then used to roll thread fastener blanks. To facilitate creation of the dies, EDM processes are used to create the features that evolve along the length of a roll thread forming die of the type generally known in the art. FIG. 7 illustrates an exemplary machining process for an EDM tool used in this technique. As shown in FIG. 7, the tool, designated generally by reference numeral 78, may be formed of any suitable material, typically graphite for EDM processes. The tool presents bosses 80 generally similar to the bosses which will be formed on the resulting fastener, and bases 82 similar to the bases of the leads desired on the fastener. Where evolution of the features is desired along the length of the threads, these will similarly evolve along the length of the bosses and bases formed on the EDM tool. Creation of the bosses and bases is performed in any suitable manner, such as through milling operations as illustrated in FIG. 7. In the embodiment of FIG. 7, the features are formed by end milling along tool pads 84, 86, 88 and 90 to form the lead profiles and the spaces separating the leads. Similar machining operations are performed along the entire surface of the EDM tool as needed, depending upon the size of the resulting die.

FIG. 8 illustrates a die for roll threading a fastener formed through the use of a tool such as that shown in FIG. 7. As will be appreciated by those skilled in the art, such roll threading dies, designating generally by the reference numeral 92 in FIG. 8, include a sharpening section 94 and a thread forming section 96. Grooves or striations are formed along the die, as shown in dashed lines in FIG. 8, to facilitate drawing the fastener blank along the die. As will also be appreciated by those skilled in the art, such dies are typically employed in pairs, with one die being stationary and a second die oscillating to draw and rotate the fastener blank therebetween and to form the threads. By a plunge EDM process, then, features are formed along the die corresponding to the bosses and bases of the fastener lead. Through use of a tool 78 as illustrated in FIG. 7, then, a die as illustrated in FIG. 8 will present a series of linear recesses, including relatively deeper recesses 98 corresponding to the desired bosses along the leads, and relatively shallower recesses 100 corresponding to the bases along the lead profile. It has been found that the use of plunge EDM processes for forming the dies for the present fastener profiles greatly facilitates the production of the dies, and the formation of the desired profiles along the fastener, particularly where these profiles may be varied.

Figure 9:
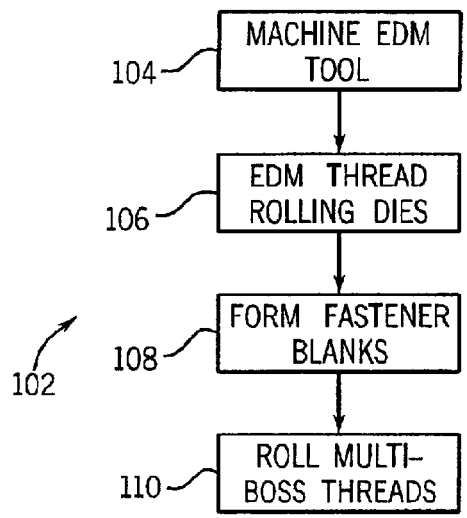
FIG. 9 is a flow chart illustrating exemplary steps in a manufacturing process for creating fasteners in accordance with the present technique through electric-discharge machining of dies, and roll forming of multiple boss threads.

FIG. 9 is a flow chart illustrating exemplary steps in a process for forming dies and fasteners in accordance with aspects of the technique described above. The method, designated generally by reference numeral 102 in FIG. 7, begins with machining of the EDM tool at step 104. Again, step 104 may include any suitable machining processes, such as milling of the features desired on the resulting fastener. As step 106, the thread rolling dies are formed by plunge EDM processes to create the progressive thread forming recesses as described above with reference to FIG. 8. At step 108 fastener blanks are formed. As will be appreciated by those skilled in the art, such blanks typically include an unthreaded shank dimension to provide sufficient material for the threads which are upset from the shank during the thread rolling operation. Finally, at step 110 the multi-boss threads are rolled onto the blanks through the use of specially adapted dies such as that illustrated in FIG. 8.

Figure 10:
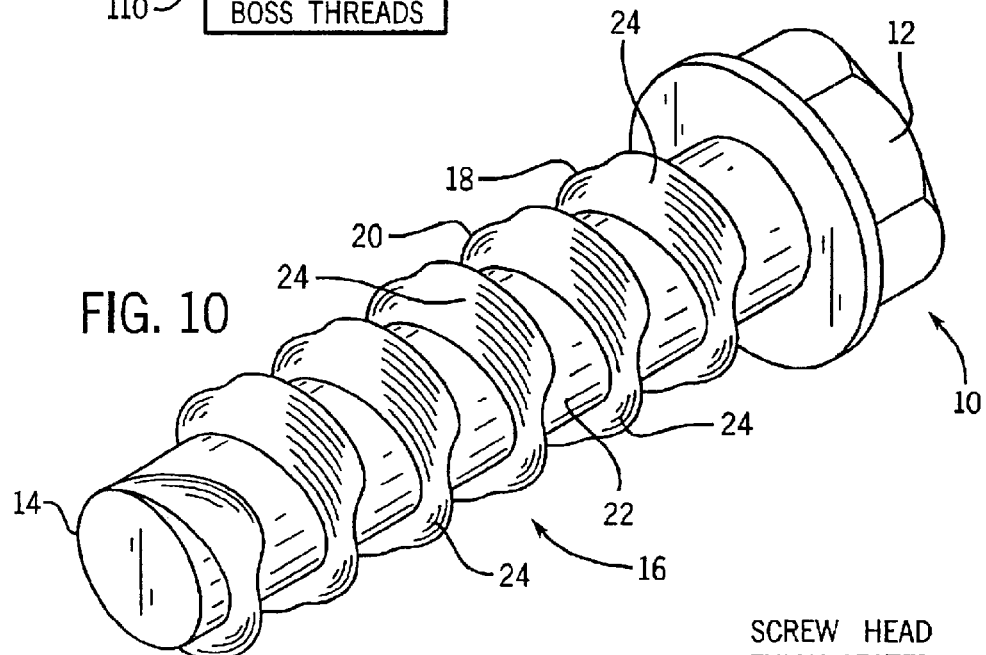
FIG. 10 is a perspective view of an alternative configuration for a fastener in accordance with aspects of the present technique having a single lead.

FIG. 10 illustrates an alternative embodiment in accordance with aspects of the foregoing technique, wherein a single lead is provided. While the double-lead configuration provides excellent torque characteristics, in certain applications, aspects of the present technique may be incorporated with a single lead. Thus, in the embodiment of FIG. 10, rather than separate leads 18 and 20, the reference numerals refer to turns of the same lead. For enhancing insertion torque and resistance to pull-out, however, the forgoing teachings with regards to the presence of bosses 24, and to the configuration of the bosses, differences between bosses, differences between lead-in and lead-out profiles, and so forth, may be incorporated into the single-lead fastener.

Figure 11:
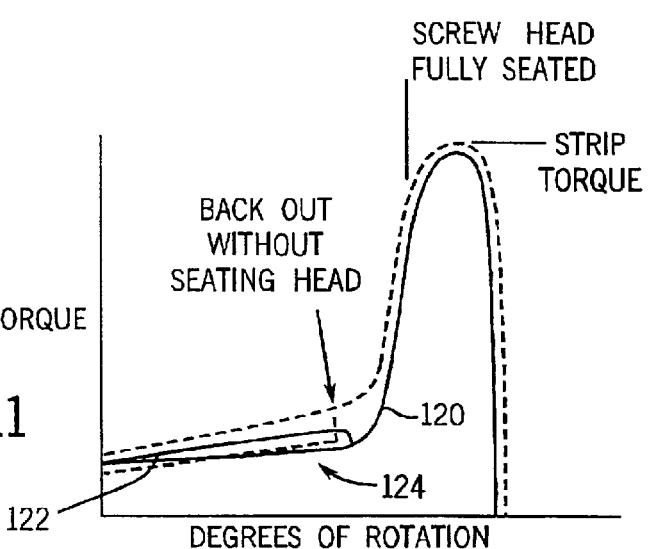
FIG. 11 is a graphical representation of torques encountered for insertion of a double-lead fastener in accordance with the aspects of the present technique.

As noted above, the present technique provides for excellent insertion torque and high resistance to pull-out. FIG. 11 illustrates exemplary insertion torque of a fastener having two leads with correspondingly located bosses and recesses as described above. As shown in FIG. 11, reference numeral 120 refers to a torque curve for insertion torques as the fastener is inserted into a base material. As illustrated in the Figure, the torque curve begins at a fairly low level 122 as the fastener is begun to be inserted. Thereafter, torque increases somewhat within a middle range 124, but remains relatively constant as compared to conventional lobed fasteners. While some undulation may be encountered where bosses begin entry into the material, it has been found that such changes in insertion torque are extremely minimal. As also noted above, the present technique provides a fastener having excellent resistance to pull-out. It has been found, in particular, that ratios in excess of 1:1 can be obtained through the present technique (i.e., pull-out to insertion torques). While conventional fasteners may obtain ratios on the order of 0.8:1, tests have indicated that double-lead fasteners configured in accordance with the foregoing teachings can obtain ratios on the order of 1.1:1 (in materials such as nylon) and higher.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A threaded fastener comprising:
 a head;
 a tip; and a threaded shank extending between the head and the tip, the threaded shank having a helical lead formed thereon, the lead including a plurality of bosses therealong, successive bosses being separated from one another by recessed bases, each boss extending radially beyond adjacent bases and presenting a respective profile including a lead-in profile in a direction towards the tip, a respective lead-out profile in a direction towards the head and a central section of substantially uniform radial dimension, wherein the respective profiles comprise a crest profile defining a single continuous apex.

2. The fastener of claim 1, wherein the respective profiles of at least two bosses differ from one another.

3. The fastener of claim 2, wherein the respective lead-in profiles of the at least two bosses differ from one another.

4. The fastener of claim 2, wherein the respective lead-out profiles of the at least two bosses differ from one another.

5. The fastener of claim 2, wherein the respective profiles differ from one another in length.

6. The fastener of claim 1, wherein at least two bases differ from one another.

7. The fastener of claim 6, wherein the at least two bases differ from one another in length.

8. The fastener of claim 1, wherein for at least one of the bosses the lead-in profile differs from the lead-out profile.

9. The fastener of claim 1, wherein each recessed base includes a central section of substantially uniform radial dimension.

10. A threaded fastener comprising:
a head;
a tip;
a threaded shank extending between the head and the tip;
a first helical lead formed on the shank and including a plurality of first bosses therealong, successive first bosses being separated from one another by first bases, each first boss extending radially beyond adjacent first bases and presenting a respective profile including a lead-in profile in a direction towards the tip, a respective lead-out profile in a direction towards the head, and a central section of substantially uniform radial dimension; and
a second helical lead including a plurality of second bosses therealong, successive second bosses being separated from one another by second bases, each second boss extending radially beyond adjacent second bases and presenting a respective profile including a lead-in profile in a direction towards the tip, a respective lead-out profile in a direction towards the head, and a central section of substantially uniform radial dimension;
wherein the profiles of the first and second leads are configured to provide a substantially constant insertion torque, and wherein each of the respective profiles comprise a crest profile defining a single continuous apex, and
wherein profiles of at least two bosses of the first lead differ from one another and profiles of at least two bosses of the second lead differ from one another.

11. The fastener of claim 10, wherein the respective lead-in profiles of the at least two bosses of the first and second lead differ from one another.

12. The fastener of claim 10, wherein the respective lead-out profiles of the at least two bosses of the first and second lead differ from one another.

13. The fastener of claim 10, wherein lead-in profiles of the first lead and lead-out profiles of the second lead are disposed at corresponding locations along the shank between the tip and the head.

14. The fastener of claim 13, wherein lead-out profiles of the first lead and lead-in profiles of the second lead are disposed at corresponding locations along the shank between the tip and the head.

15. The fastener of claim 10, wherein the first bosses and the second bases are disposed at corresponding locations along the shank between the tip and the head.

16. The fastener of claim 15, wherein the second bosses and the first bases are disposed at corresponding locations along the shank between the tip and the head.

17. A double-lead threaded fastener comprising:
a tip;
ahead;
a shank extending between the tip and the head;
a first helical lead disposed about the shank and including first bosses separated by first bases, the first bosses extending radially beyond the first bases; and
a second helical lead disposed about the shank and including second bosses separated by second bases, the second bases extending radially beyond the second bases;
wherein the first bosses and the second bases are disposed along the shank at generally corresponding locations, and the second bosses and the first bases are disposed along the shank at generally corresponding locations, and wherein the first and second bosses and the first and second bases are disposed along the shank to provide a substantially constant insertion torque, and each include a central section of substantially uniform radial dimension, and wherein the bosses and bases of each of the respective leads comprise a crest profile defining a single continuous apex, and wherein lead-in profiles of at least two of the bosses of the first and the second leads are different from one another.

18. The fastener of claim 17, wherein each of the first and second bosses includes a respective lead-in profile and lead-out profile, and wherein the lead-in profiles of the first bosses and the lead-out profiles of the second bosses are disposed at generally corresponding locations along the shank, and the lead-out profiles of the first bosses and the lead-in profiles of the second bosses are disposed at generally corresponding locations along the shank.

19. The fastener of claim 18, wherein lead-out profiles of at least two of the bosses of the first and second leads are different from one another.

20. The fastener of claim 18, wherein the lead-in profiles of the bosses of the first and second leads are inclined less than the lead-out profiles for the same bosses.

21. The fastener of claim 17, wherein the first lead is identical to the second lead.

22. A double-lead threaded fastener comprising:
a tip;
ahead;
a shank extending between the tip and the head;
a first helical lead disposed about the shank and including first bosses separated by first bases, the first bosses extending radially beyond the first bases and having a central section of substantially uniform radial dimension; and
a second helical lead identical to the first helical lead, the second helical lead being disposed about the shank and including second bosses separated by second bases, the second bases extending radially beyond the second bases and having a central section of substantially uniform radial dimension;

wherein the respective first and second bosses are displaced from one another by 180 degrees at generally corresponding locations along the shank, and wherein the first and second bosses and the first and second bases are disposed along the shank to provide a substantially constant insertion torque, and wherein the bosses and bases of each of the respective leads comprise a crest profile defining a single continuous apex.

23. The fastener of claim 22, wherein each of the first and second bosses includes a respective lead-in profile and lead-out profile, and wherein the lead-in profiles of the first bosses and the lead-out profiles of the second bosses are disposed at generally corresponding locations along the shank, and the lead-out profiles of the first bosses and the lead-in profiles of the second bosses are disposed at generally corresponding locations along the shank.

24. The fastener of claim 23, wherein the lead-in profiles of at least two of the bosses of the first and the second leads are different from one another.

25. The fastener of claim 23, wherein lead-out profiles of at least two of the bosses of the first and second leads are different from one another.

26. The fastener of claim 23, wherein the lead-in profiles of the bosses of the first and second leads are inclined less than the lead-out profiles for the same bosses.

27. The fastener of claim 22, wherein profiles of bosses of the first and the second leads vary along the shank from the tip to the head.

28. A double-lead threaded fastener comprising:
a tip;
a head;
a shank extending between the tip and the head;
a first helical lead disposed about the shank and including first bosses separated by first bases, the first bosses extending radially beyond the first bases and less than a 360 degrees around the shank and having a central section of substantially uniform radial dimension; and
a second helical lead identical to the first helical lead, the second helical lead being disposed about the shank and including second bosses separated by second bases, the second bases extending radially beyond the second bases and less than 360 degrees around the shank and having a central section of substantially uniform radial dimension;
wherein the respective first and second bosses are displaced from one another by 180 degrees at generally corresponding locations along the shank, and wherein the first and second bosses and the first and second bases are disposed along the shank to provide a substantially constant insertion torque, and wherein the bosses and bases of each of the respective leads comprise a crest profile defining a single continuous apex.

29. The fastener of claim 28, wherein each of the first and second bosses includes a respective lead-in profile and lead-out profile, and wherein the lead-in profiles of the first bosses and the lead-out profiles of the second bosses are disposed at generally corresponding locations along the shank, and the lead-out profiles of the first bosses and the lead-in profiles of the second bosses are disposed at generally corresponding locations along the shank.

30. The fastener of claim 29, wherein the lead-in profiles of at least two of the bosses of the first and the second leads are different from one another.

31. The fastener of claim 29, wherein lead-out profiles of at least two of the bosses of the first and second leads are different from one another.

32. The fastener of claim 29, wherein the lead-in profiles of the bosses of the first and second leads are inclined less than the lead-out profiles for the same bosses.

33. The fastener of claim 28, wherein profiles of bosses of the first and the second leads vary along the shank from the tip to the head.

34. The fastener of claim 28, wherein each of the first and second bosses extends less than 180 degrees around the shank.

35. The fastener of claim 34, wherein each of the first and second bosses extends less than 90 degrees around the shank.

36. A threaded fastener comprising:
ahead;
a tip; and
a threaded shank extending between the head and the tip, the threaded shank having a helical lead formed thereon, the lead including a plurality of bosses therealong, successive bosses being separated from one another by recessed bases, each boss extending radially beyond adjacent bases and presenting a respective profile including a lead-in profile in a direction towards the tip, a respective lead-out profile in a direction towards the head and a central section of substantially uniform radial dimension, wherein a ratio of removal torque to insertion torque is greater than 0.8, and wherein the bosses and bases of the lead comprise a crest profile defining a single continuous apex.

37. The threaded fastener of claim 36, wherein the ratio is greater than 0.9.

38. The threaded fastener of claim 36, wherein the ratio is greater than 1.0.

39. The threaded fastener of claim 38, wherein the ratio is greater than 1.1.

40. The threaded fastener of claim 36, wherein the fastener comprises first and second leads about a shank, each lead having a series of bosses, lead-in profiles and lead-out profiles of the bosses differing from one another to provide the ratio.

41. The threaded fastener of claim 40, wherein the first and second leads are identical to one another.

42. The threaded fastener of claim 40, wherein crests of the lead-in profiles are inclined at approximately 15 degrees from the thread root, and crests of the lead-out profiles are inclined at approximately 45 degrees from the thread root.

43. A threaded fastener comprising:
a head;
a tip; and
a threaded shank extending between the head and the tip, the threaded shank having a helical lead formed thereon, the lead including a plurality of bosses therealong, successive bosses being separated from one another by recessed bases, each recessed base including a central section of substantially uniform radial dimension, and each boss extending radially beyond adjacent bases and presenting a respective profile including a lead-in profile in a direction towards the tip, a respective lead-out profile in a direction towards the head and a central section of substantially uniform radial dimension, wherein the respective profiles comprise a crest profile defining a single continuous apex.

44. A threaded fastener comprising:
a head;
a tip; and
a threaded shank extending between the head and the tip, the threaded shank having a helical lead formed thereon, the lead including a plurality of bosses therealong, successive bosses being separated from one another by recessed bases, each boss extending radially beyond adjacent bases and presenting a respective profile including a lead-in profile in a direction towards the tip, a respective lead-out profile in a direction towards the head and a central section of substantially uniform radial dimension, wherein the respective profiles comprise a crest profile defining a single continuous apex; and wherein the lead-in profile of at least one of the bosses is different from the lead-out profile of the same boss.

* * * * *